(12) United States Patent
Diehl et al.

(10) Patent No.: US 10,052,783 B2
(45) Date of Patent: Aug. 21, 2018

(54) METHOD FOR THE MANUFACTURE OF A HOLE IN A COMPONENT CONSISTING OF A COMPOSITE MATERIAL

(71) Applicant: PROFIL VERBINDUNGSTECHNIK GMBH & CO. KG, Friedrichsdorf (DE)

(72) Inventors: Oliver Diehl, Bad Homburg v.d.H (DE); Richard Humpert, Bad Nauheim (DE); Andreas Lembach, Darmstadt (DE); Christian Sowa, Offenbach (DE)

(73) Assignee: PROFIL VERBINDUNGSTECHNIK GMBH & CO, KG, Friedrichsdorf (DE)

( * ) Notice: Subject to any disclaimer, the term of this patent is extended or adjusted under 35 U.S.C. 154(b) by 114 days.

(21) Appl. No.: 15/147,771

(22) Filed: May 5, 2016

(65) Prior Publication Data

US 2016/0243718 A1 Aug. 25, 2016

Related U.S. Application Data

(62) Division of application No. 13/745,080, filed on Jan. 18, 2013, now Pat. No. 9,358,721.

(30) Foreign Application Priority Data

Jan. 20, 2012 (DE) .......................... 10 2012 001 067
Jun. 6, 2012 (DE) .......................... 10 2012 209 599

(51) Int. Cl.
*B26F 1/24* (2006.01)
*B26D 7/20* (2006.01)
(Continued)

(52) U.S. Cl.
CPC .................. *B26F 1/24* (2013.01); *B26D 7/10* (2013.01); *B26D 7/20* (2013.01); *B29C 51/42* (2013.01); *B26F 2001/4427* (2013.01)

(58) Field of Classification Search
CPC ...... B26F 1/24; B26F 7/20; B26F 2001/4427; B26D 7/10; B29C 51/42
(Continued)

(56) References Cited

U.S. PATENT DOCUMENTS 3,640,665 A * 2/1972 Seefluth .................. B29C 49/76
425/297
4,450,578 A * 5/1984 Hill .......................... G21F 5/04
378/150

(Continued)

FOREIGN PATENT DOCUMENTS

| DE | 197 14 429 A1 | 10/1997 |
| DE | 102 32 148 B4 | 1/2009 |
| EP | 1 048 419 A1 | 11/2000 |
| EP | 1 839 825 A1 | 10/2007 |
| WO | WO 2010/007018 A1 | 1/2010 |

OTHER PUBLICATIONS

German Search Report dated Aug. 21, 2012 issued in German Patent Appln. No. 10 2012 001 067.2.
(Continued)

*Primary Examiner* — Matthew J Daniels
*Assistant Examiner* — Leith S Shafi
(74) *Attorney, Agent, or Firm* — Hershkovitz & Associates, PLLC; Abe Hershkovitz; Eugene C. Rzucidlo

(57) ABSTRACT

A method for the manufacture of a hole in a component consisting of a composite material, such as a fiber reinforced plastic part or a fabric reinforced plastic part, which is characterized in that the component having first and second oppositely disposed sides is placed with its first side on a support having an iris diaphragm, in that a tip which diverges in the axial direction is pressed coming from the second side of the component through the component, which optionally has a pre-piercing, for the formation of the hole or for the enlargement of the pre-piercing and in that the iris diaphragm has a smaller starting opening which receives a
(Continued)

narrower region of the tip and opens into a larger opening with increasing penetration of the component by the tip, whereby the component is supported during the hole formation over an as large as possible area from the first side. A piercing aid in the form of an iris diaphragm or a corresponding die button is likewise claimed.

38 Claims, 8 Drawing Sheets

(51) Int. Cl.
    *B29C 51/42*     (2006.01)
    *B26D 7/10*     (2006.01)
    *B26F 1/44*     (2006.01)

(58) Field of Classification Search
USPC ........... 29/432, 521, 509; 72/89.1, 396, 381, 72/386, 389, 399, 400, 401; 264/154, 264/155, 156, 280, 284, 293, 479, 383; 425/416; 83/30
See application file for complete search history.

(56) References Cited

U.S. PATENT DOCUMENTS

| | | | |
|---|---|---|---|
| 4,896,415 A * | 1/1990 | Bock | B29C 49/00 220/760 |
| 6,867,932 B2 * | 3/2005 | Noguchi | G03B 9/10 359/739 |
| 2003/0085213 A1 | 5/2003 | Burckhardt | |
| 2007/0295178 A1 | 12/2007 | Tsuji | |
| 2009/0233046 A1 | 9/2009 | Lulianetti | |

OTHER PUBLICATIONS

English translation of German Search Report.
English Abstract of EP 1 048 419 A1.
English Abstract of EP 1 839 825 A1.
Plastics International (Cast Nylon 6). Published Aug. 28, 2008.
Rugged Iris Mechanism. Published Dec. 11, 2006. Nasa Tech Briefs.

* cited by examiner

METHOD FOR THE MANUFACTURE OF A HOLE IN A COMPONENT CONSISTING OF A COMPOSITE MATERIAL

CROSS-REFERENCE TO RELATED APPLICATIONS

This application is a Divisional of U.S. application Ser. No. 13/745,080, filed Jan. 18, 2013, which claims priority under 35 U.S.C. § 119 to German Patent Application No. 10 2012 001 067.2, filed on Jan. 20, 2012 and German Patent Application No. 10 2012 209 599.3, filed on Jun. 6, 2012, the disclosures of which are expressly incorporated by reference herein in their entireties.

FIELD OF THE INVENTION

The present invention relates to a method for the manufacture of a hole in a component consisting of a composite material such as a fiber reinforced plastic part or a fabric reinforced plastic part and also a piercing aid for this purpose.

BACKGROUND OF THE INVENTION

Composite materials are frequently used in the most diverse areas and consist mainly of plastic with embedded fiber reinforcement which are amongst other things also known in the form of tapes, fabrics, felts and mats. For example, coachwork parts of polyester resins reinforced with glass fibers and plastics, such as epoxy resins reinforced with carbon fibers, are frequently used in motor car construction. Numerous further components, such as consoles and cladding, are likewise also manufactured from such composite materials. When using carbon fibers as a reinforcement, fabrics of carbon fibers are frequently used because one can then obtain a reinforcement in all directions of the component.

The field of composite materials is, however, in no way restricted to glass fibers and carbon fibers there are many other reinforcement fibers which can be considered. Furthermore, the most diverse plastics can also be used as a matrix material. All such materials are described here generically as composite materials and fiber reinforced plastics. They can also be described by the generic term "organic sheet metals". This term is understood in some circles as a specialist term.

Composite materials are composed of an arbitrary reinforcement material or fibers and an arbitrary, plastically deformable or meltable matrix material. The term "composite material" is used here in accordance with the invention and for this reason not only comprises plastics with fiber reinforcement, but, for example, also comprises matrix materials of metal, e.g. aluminum with a reinforcement material, such as e.g. carbon fiber or ceramic particles.

SUMMARY OF THE INVENTION

The present invention primarily uses those composite materials which use a thermoplastic material, i.e. a thermoplastic as matrix material which softens or becomes pasty at elevated temperatures lying below the melting point. It is, however, not precluded that duroplastics can also be used as a matrix material provided these are adequately soft or become soft or pasty at elevated temperatures, i.e. at temperatures which lie beneath the temperatures at which the matrix material is permanently damaged. The method claimed here can also be used for composite materials with matrix materials which are indeed not thermoplastics but have not yet reached their final state but rather are present in a state in which they soften with or without heating but which can be transferred into a harder state in the course of time or by the action of ultraviolet light or humidity or otherwise through progressive polymerization or crosslinking.

It is frequently necessary to use components of composite materials with fastener elements, for example, in order to secure the corresponding components to other parts or to attach other parts to the fiber reinforced plastic components.

Both rivet elements and also bolt or nut elements can be considered which can all be subsumed under the term functional elements. This term applies also for clips and bearings which can likewise be secured to composite materials. Irrespective of what form such functional elements have it is always necessary to provide a hole or a plurality of holes to a plastic part in order to enable the attachment of the respective desired functional element, unless threaded inserts or eyes are integrated into the plastic component during the manufacture of the component, which is, however, very time consuming and complicated and leads to further costs and sometimes makes a local thickening of the plastic part necessary. The manufacture of holes is mainly achieved by a drilling process, whereby material residues, such as cuttings, arise and the composite material is weakened in the region of the bore. It is also conceivable to punch the component in order to generate the holes as required, whereby waste in the form of punching slugs which has to be dispensed of arises as well as a local weakening of the component.

The object of the present invention lies in providing a method and piercing aid which enable the provision of holes in a component at least in a substantially loss-free manner without pronounced weakening of the component, in particular holes for the reception of functional elements such as rivets, rivet bolts and rivet nuts and also bolt elements and nut elements in general.

Furthermore, a pronounced weakening of the component in the area of the hole should not only be avoided but rather a reinforcement of the region of the hole should preferably take place.

In other respects, the method should be capable of being carried out in a cost-favorable manner and the piercing aid should be capable of being realized in a cost-favorable manner.

In order to satisfy this objects, a method of the initially named kind is characterized in that that the component having first and second oppositely disposed sides is placed with its first side on a support having an iris diaphragm, in that a tip which diverges in the axial direction is pressed coming from the second side of the component through the component, which optionally has a pre-piercing, for the formation of the hole or for the enlargement of the pre-piercing and in that the iris diaphragm has a smaller starting opening which receives a narrower region of the tip and opens into a larger opening with increasing penetration of the component by the tip.

As a result the component is supported during the hole formation over an as large as possible area from the first side. When it is said that the tip diverges in the axial direction this will be understood to mean that the tip diverges in a rearward direction starting from the front end or apex of the tip, which is generally a point or a sharp or rounded apex.

The corresponding piercing aid for the formation of a hole in a component consisting, in particular of a composite material, such as a fiber reinforced plastic part or a fabric reinforced plastic part is characterized in that the piercing aid is an iris diaphragm having a smaller initial opening which can be pressed apart to a larger opening.

Thus, in accordance with the invention, the component of a composite material is provided with a hole by means of a tip which is pressed through the component while the component is supported from the underside and indeed in the region of the piercing always directly adjacent to the tip so that as little composite material as possible can escape between the sidewall of the tip and the periphery of the hole, since the opening of the iris diaphragm always adapts to the respective diameter or the respective cross-sectional shape of the tip in the area of the enlarging hole.

Since a tip is used, the fiber reinforcement in the region of the hole is not destroyed to a considerable extent as is the case during drilling or punching, but rather at most only a few fibers are parted and the material, which is normally cut out is, in accordance with the invention, displaced to the side and forms a thickened region there which is likewise reinforced with fibers. Thus, in the region of the hole, and around this a fiber reinforced thickening of the component automatically arises. In this way forces can better be introduced from the functional element into the component without fatigue or crack formation having to be feared in the region of the peripheral hole. Furthermore, no lost material arises which has to be disposed off and no dangers to health arise from free sharp fiber residues because these do not arise.

It is indeed entirely possible to carry out the entire piercing method with the aid of the tip and the iris diaphragm, it is, however, not precluded that a pre-piercing is effected. For example, pre-piercing of this kind could be effected during manufacture of the fiber reinforced component in a press or in a drilling process, for example, then when a type of pre-positioning or pre-centering of the fiber reinforced component relative to another component or vice versa has to be ensured by the pre-piercing.

An iris diaphragm is preferably used which forms a part of a die button received in the support with the end face of the die button confronting the component either being flush area-wise with the local plane of the support or arranged set back from the latter.

The this flush area-wise alignment is favorable because the fiber reinforced plastic material cannot escape downwardly but rather the aforesaid thickening takes place at the upper side of the component, the fiber reinforced plastic swells so to say there.

The full area support of the component in this region also has the advantage that the diaphragm segments of the iris diaphragm are better supported against tilting movements. A slightly set back arrangement of the iris diaphragm or of the end face of the die button is, however, useful under some circumstances, for example when the thickened portion is desired at the lower side of the component. Provision should then, however, be made that the fiber reinforced plastic part is not sheared at a peripheral edge, for example by provision of a rounded edge and that the diaphragm segments are secured against a tilting movement, for example, in that the surface of the supported regions of the diaphragm segments aperture of the die button are made significantly larger than the surface in the region of this aperture or in that the segments have external shoulders which are arranged flush area-wise with the support.

When here there is talk of "underside" and of a "support" or of "supporting" this is only related to a representation of the component and indeed in such a way that this is arranged above the support or the iris diaphragm or supported there, as shown in FIG. 1 at the bottom. In practice, the component could have any desired orientation, for example, such that the support is arranged above the component and the tip is arranged coming from below or indeed such that the component has any desired inclined position.

The force which is exerted on the tip can be applied in a press, by tongs, by a robot, by means of a C-frame with power unit or in a tool such as an arbor press or pillar drill (drill press) or otherwise.

The iris diaphragm is preferably automatically reset after each piercing of the component from the larger opening to the smaller opening.

It is particularly favorable when the component is heated, at least in the region of the piercing, to a matrix material dependent temperature at which the matrix material of the composite material is not melted, but softens or becomes pasty, for example, at a temperature of 260° when the material is PA6.

The auxiliary means, such as a piercing aid, for the hole formation in a component consisting in particular of a composite material is preferably characterized in that the iris diaphragm has at least two to twelve movably arranged diaphragm segments which are arranged in one plane or a in a plurality of planes or preferably in two planes.

It is sufficient, when two mutually displaceable diaphragm segments are provided. Problems such that the fiber reinforced plastic material escapes at the diaphragm segments in the region of the respective cross-section of the tip need not be feared. Two such diaphragm segments can be used when they, for example, each have a V-shaped opening which together form a square opening or each have a half hexagonal opening which jointly form a hexagonal opening. Both a square opening and also a hexagonal opening represents a not unreasonable adaptation to a circular shape and indeed such that a respective opening of the iris diaphragm grows with the circular shape of the tip during the progressive penetration of the tip. It is, however, somewhat problematic that with two overlapping diaphragm segments these must at least partly lie in two planes, whereby a step is formed which can lead to a corresponding step in the component. The diaphragm segments can, however, be made relatively thin and a step of this kind can be kept very small.

The movably arranged segments are preferably guidedly arranged in a mount or in a plurality of mounts of a die button body. In this way the diaphragm segments can be accommodated in the well ordered manner secured against loss and can also be synchronizably guided and resiliently resetable.

For this purpose, an arrangement of the diaphragm segments in two planes in one mount can be formed in the end face of a die button body confronting the component and a second mount can be formed in a disk which is to be arranged or is arranged on the end face of the die button body or recessed within it. This represents a simple but effective possibility for accommodating the diaphragm segments in two planes. The use of a disk for one mount permits a rotation of this mount relative to the mount in the die button body which is particularly favorable, as has already been explained.

The diaphragm segments of the iris diaphragm are preferably each biased into a position in which they form the smaller starting opening. A bias of this kind ensures that after a piercing process, which is, for example, brought about by means of a stroke of a press or of another tool, the iris diaphragm automatically adopts the starting position for a further piercing process with a new component and with a further stroke of the tool.

A device is preferably provided which synchronizes the movement of the diaphragm segments. In this way it can be ensured that the respective opening or size of the opening of the iris diaphragms is matched to the respective cross-sectional shape and cross-sectional size of the tip.

For this purpose a plurality of possibilities are available. For example, the synchronization device can be formed by the tip which itself broadens in the axial direction when the guidance of the diaphragm segments is effected, such that they are guided by the peripheral wall of the mount or otherwise under the pressure which is exerted from the inside by the tip.

Pins can also be attached or provided at the diaphragm segments which are guided in corresponding bores in the sidewalls of the mounts.

A compulsory guidance may be considered for the synchronizing device which is movable synchronously with the hole formation. For example, a rotary ring with pins which engage in curved spiral groove segments of the diaphragm segments can be rotated synchronously with the axial movement of the tip by means of a suitable stepping motor or mechanical mechanism.

It is particularly favorable when the diaphragm segments lie in a first and in a second plane, the diaphragm segments of the first plane form a substantially polygonal hole, the diaphragm segments for the second plane form an at least substantially polygonal hole and the polygonal hole of the first plane is offset relative to the polygonal hole of the second plane by one half side length of the polygonal hole.

With an arrangement of this kind, a hexagonal opening can be formed by the iris diaphragm or the diaphragm segments using three diaphragm segments in each of the two planes, which represents a good approximation to a circular cross-section of a conical tip. With four diaphragm segments in each plane an octagonal opening of the iris diaphragm can be realized which enables an even better approximation to the circular cross-section of a conical tip.

With an arrangement of this kind having four diaphragm segments in each plane the diaphragm segments of each plane are arranged in an at least substantially square mount and each diaphragm segment can be executed, apart from the rounded corner regions, with four straight sides and indeed two longer and two shorter sides of which a first pair form a right angle with one another and a second pair form a right angle with one another with two further enclosed angles of the four enclosed angles of the diaphragm segments amounting to 45° and 135°.

It is particularly favorable when a piercing aid is provided in combination with a tip which is formed by the free end face of the shaft part of a pin or as an auxiliary tip, and with the combination being characterized in that a cross-sectional shape and cross-sectional size of the tip or of the auxiliary tip in the longitudinal direction of the tip or of the auxiliary tip is always matched to the respective cross-sectional shape and cross-sectional size of the widening opening of the iris diaphragm.

Expressed differently, the adaptation of the cross-sectional shape and cross-sectional size of the tip to the cross-sectional shape and cross-sectional size of the opening of the iris diaphragm takes place such that independently of the degree of penetration of the iris diaphragm by the tip or auxiliary tip, the cross-sectional shape and cross-sectional size of the tip or of the auxiliary tip in the region of the opening of the iris diaphragm always corresponds to the cross-sectional shape and cross-sectional size of the respective opening.

As a result of this design the cross-section of the tip or of the auxiliary tip always fills the respective opening of the iris diaphragm, such that no corner or other regions of the respective opening exist through which material of the composite material can escape through the iris diaphragm.

The concept as just explained can be particularly advantageously realized when the iris diaphragm is equipped with two diaphragm segments and the tip or the auxiliary tip has a duck-beak shape. With such an embodiment the diaphragm segments can each be formed by a plate having a circular hole, with the one plate being slidable on the other plate. An arrangement of this kind can be particularly favorably realized because the corresponding holes only have to be drilled or punched out. Moreover, the plates only have to slide relatively to one another in one direction, whereby both the guidance of the plates and the resetting of the plates can be realized particularly simply.

BRIEF DESCRIPTION OF THE FIGURES

The invention will be explained in more detail in the following with reference to an embodiment with respect to the drawing in which are shown.

DETAILED DESCRIPTION OF THE INVENTION

Figure 1A:
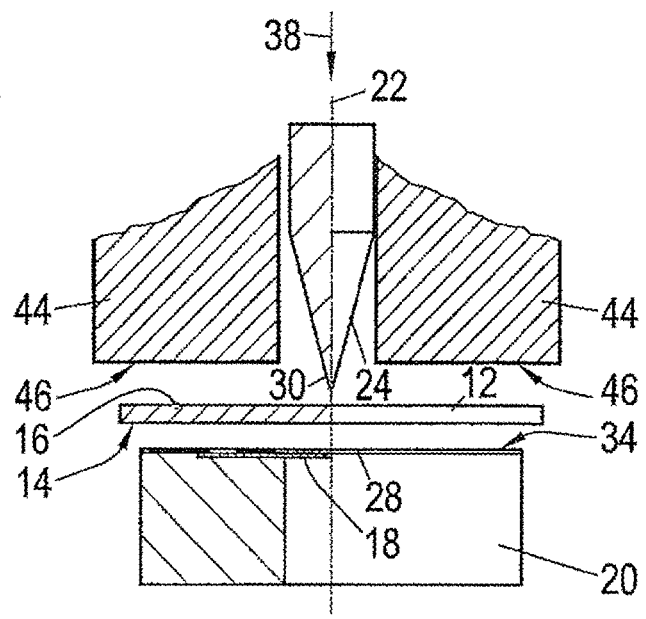
FIGS. 1A to 1C a series of drawings for representing the principle of the method in accordance with the invention with the respective three phases of the method, FIGS. 2A to 2F a series of drawings for illustrating the principle of a design of a piercing aid in accordance with the invention in the form of a die button having an iris diaphragm with a perspective illustration of an upper disk (FIG. 2A), a perspective illustration of a first arrangement of four diaphragm segments (FIG. 2B), a perspective illustration of a second arrangement of four diaphragm segments (FIG. 2C), a perspective illustration of a die button body (FIG. 2D) and with a perspective illustration of the assembled die button with the iris diaphragm in a closed position (FIG. 2E) and in an opened position (FIG. 2F), FIGS. 3A to 3C an embodiment of an auxiliary tip in accordance with the invention in a perspective representation (FIG. 3A) in a plan view onto the side of the auxiliary tip (FIG. 3B) and in a side view (FIG. 3C) perpendicular to the plan view of FIG. 3B, and FIGS. 4A to 4C three phases of the piercing of the composite material with the aid of the auxiliary tip in accordance with FIGS. 3A to 3C.
Figure 1B:
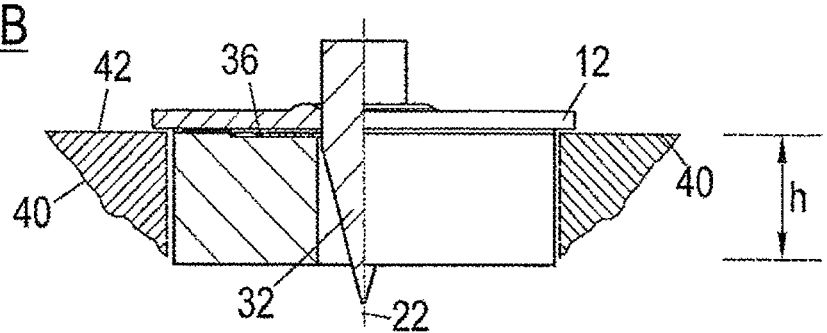
Figure 1C:
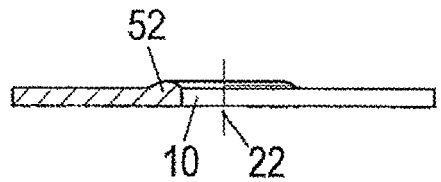

Referring to FIGS. 1A to 1C the method for the manufacture of a hole 10 in a component 12 consisting of a composite material, such as a fiber reinforced plastic part or a fabric reinforced plastic part, will be explained in more detail. The component 12 has first and second oppositely disposed sides 14 and 16 and is supported at its first side 14 on a support 20 having an iris diaphragm 18. A tip 24 which becomes progressively broader in the axial direction 22 is pressed through the component 12 (which may have a pre-piercing—which is however not shown) for the formation of the hole 10 or for the dilation of the pre-piercing. The iris diaphragm 18 has a smaller initial opening 28 which receives a narrower region of the tip 24 and which transforms with progressive penetration of the component by the tip into a larger opening 32, whereby the component is always supported over the fullest area possible during the hole formation from the first side 14, partly by the end face 34 of the support 20 and partly by the upper side of the diaphragm segments 36 of the iris diaphragm.

The force which is exerted in the direction of the arrow 38 onto the tip can be applied in a press, by a pair of tongs, by a robot, by means of a C-frame with a power unit or in another tool such as an arbor press or pillar drill (drill press) or otherwise. In this connection the support 20 is supported on a base plate of the corresponding tool or the like and the component is pressed under the pressure of the tip against the upper side 34 of the die button or of the diaphragm segments 36, as is shown in FIG. 1B.

A support 20 can, as shown, be formed by a die button or by a die button body alone, the die button can be incorporated into an opening of a table or of a lower tool, which is schematically drawn in in chain-dotted lines 40 in FIG. 1B and indeed preferably such that the upper side 34 of the die button lies flush area-wise with the local upper side 42 of the further support or of the tool 40. This upper side of the further support of the tool 40 can also have a three-dimensional shape (not shown) matching a possibly present three-dimensional shaping of the component 12.

Furthermore, the tip can be surrounded by a hold-down member 44 which, on the one hand, guides the tip and, on the other hand, is biased downwardly in FIG. 1A, similar to a sheet metal hold-down member in the processing of sheet metal parts, so that the lower end face 46 of the hold-down member 44 presses the component 12 against the upper side 34 of the die button and/or the upper side 42 of the further support 40 and holds it non-shiftably during the piercing process.

The piercing process is carried out until the finished hole 10 (FIG. 1C) corresponds to the desired diameter, which is normally the size of the tip in the cylindrical region 48, but can, however, also be smaller if the stroke h of the tip is correspondingly restricted. The diverging shape of the tip 24 finally makes it possible to manufacture holes 10 in different sizes with one tip. It is simply necessary to appropriately select the stroke h.

The iris diaphragm 18 thus forms in this example a part of a die button 20 received in the support 40 with the end face 36 of the die button which confronts the first side of the component 12 lying flush area-wise with the local plane of the support 20 or 40 respectively.

Through the explained design of the method the front end or slightly rounded end of the tip 24 presses through the fiber reinforced plastic and displaces the plastic material with the reinforcement material embedded therein to the side and, since the component 12 itself does not permit any pronounced radial movement of the material, upwardly which leads to a thickened portion 52 and the reinforcement of the component 12 as shown in FIG. 1C. The material present in the region of the thickened portion and around the margin of the hole 10 is under compressive pressure with a hoop stress and offers a considerable security against fatigue and crack formation in this region. The increased strength in this region as a result of the (fiber reinforced) thickened portion 52 is likewise favorable. The penetration of the component 12 by the tip takes place in such a way that only few reinforcement fibers are parted, so that a weakening in this region need not be feared. Furthermore, the tip 24, on the increasing penetration of the component, presses the iris diaphragm, i.e. its diaphragm segments, progressively further open, so that its opening changes from the smallest opening 28 to the largest opening in accordance with FIG. 1B. The movements of the individual diaphragm segments are synchronized by the tip favored by the compulsory guidance of the diaphragm segments as will be later explained in more detail.

After each piercing of a component the iris diaphragm or its diaphragm segments are reset from the largest opening 32 of FIG. 1B to the smaller opening 28 in accordance with FIG. 1A. This can eventually take place manually but best takes place through a suitable resetting device such as suitably arranged springs or the like (not shown).

A first embodiment of the design of an auxiliary aid (piercing aid) with an iris diaphragm 18 and an associated die button body 20 will now be described with reference to FIGS. 2A to 2D. In this connection features which are already described are characterized by the same reference numerals and it will be understood that the previous description for parts or features which have already been described also applies for the further figures and does not have to be repeated unnecessarily unless something contrary is stated.

Figure 2A:
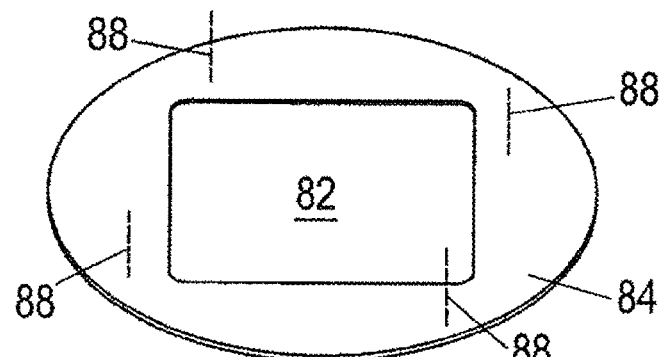
Figure 2B:
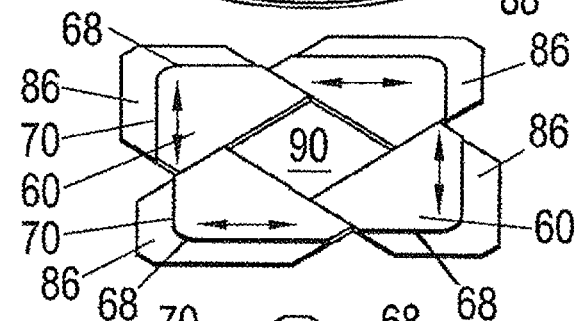

As shown in FIG. 2B, the piercing aid includes an iris diaphragm 18 with an upper plane having four diaphragm segments 60 which form a square opening 62 with a smaller initial opening 28 which can be pressed apart to a larger opening.

Figure 2C:
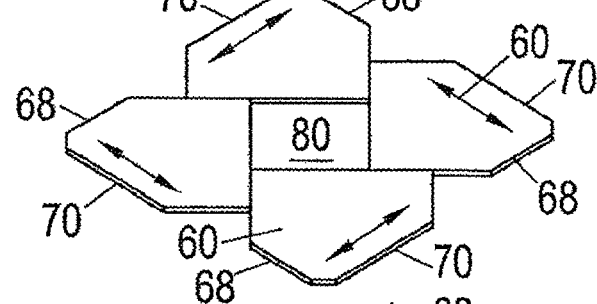
Figure 2D:
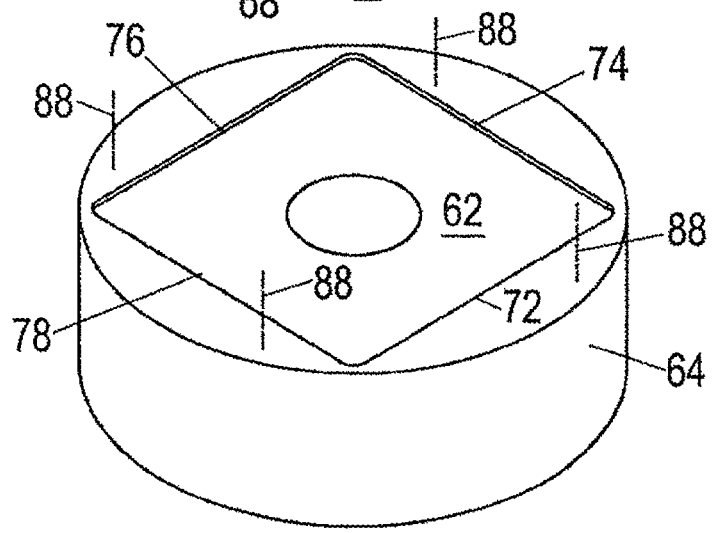
Figure 2E:
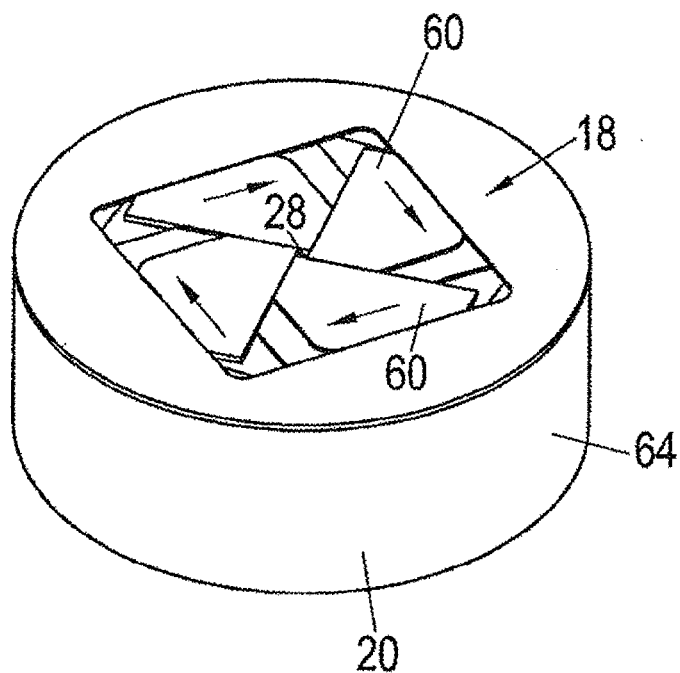
Figure 2F:
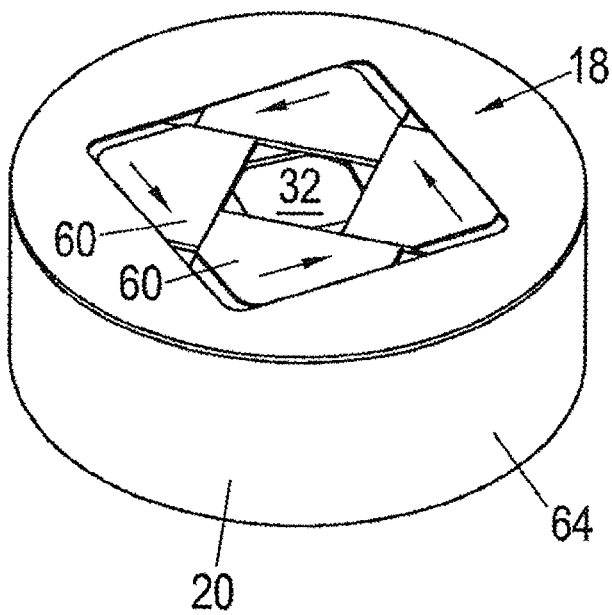

FIGS. 2E and 2F show the piercing aid in the closed state of the iris diaphragm 18 with the smaller starting opening 28 (FIG. 2E) and show, also by means of arrows, how the diaphragm segments can be pressed apart by means of the tip 24 to the larger opening 32 of FIG. 2F.

The iris diaphragm shown in FIGS. 2A to 2F has eight movably arranged diaphragm segments 60 which are arranged in two planes.

As is also evident from FIGS. 2C and 2D the four lower movably arranged segments 60 are arranged in a square mount 62 of a die button body 64. At the center of the die button body, or of the mount 62 there is a bore 66 having a diameter which is fractionally larger than the diameter of a cylindrical region of the tip 64. The sides 68 and 70 of the diaphragm segments 60 slide at the side of the side surfaces 72, 74, 76 and 78 of the mount and the diaphragm segments are guided by the side surfaces. The diaphragm segments 60 of FIG. 2C form at their mutually confronting sides a square opening 80 the size of which can be made smaller or enlarged by displacement of the diaphragm segments 60 in one or another direction in accordance with the double arrows. The square opening 80 and also other square parts and features in the FIGS. 2A to 2F appear to be rectangular. This is however only to be attributed to the perspective representation.

The further four diaphragm segments 60 of FIG. 2B which are arranged in a second square mount 82 of a disk 84 (FIG. 2A) are formed, in plan view, in accordance with the diaphragm segments of FIG. 2C but have at the upper side shoulders 86 which are arranged beneath the disk 84 and are able to slide at its underside. The level of the step formed by the shoulder 86 corresponds to the thickness of the disk 84. The size of the square opening 82 of the disk 84 is somewhat smaller than the size of the square mount 63 of the die button body 64. The disk 84 is screwed to the die button body at the points 88 by means of four counter sunk bolts. The disk 84 has the same diameter here as the die button body 64 could, however, also be made smaller and arranged in a recess manner in a circular recess in the end face of the die button body 64.

One can see from FIGS. 2A and 2D that the disk 84 is rotated by 45° relative to the die button body 64 and the mount 82 is rotated by 45° relative to the mount 74. In this way the square opening 90 of the upper diaphragm segments 60 is rotated by 45° relative to the square opening 80 of the lower diaphragm segments whereby an octagonal hole results in the assembled state. As can be seen from FIG. 2F this represents a good approximation to a circular cross-section of the tip 24 and prevents matrix material escaping downwardly to a significant extent in the axial direction.

The diaphragm segments are secured against loss, but are guided displaceably within the mount 82 by the shoulders 86 provided at the outer sides of the upper plane of the diaphragm segments 60 which lie beneath the disk 84.

The diaphragm segments of the iris diaphragms are respectively biased into a position in which they form the smaller starting opening. For this purpose, springs can be provided which act in the arrow directions of FIG. 2F. A spring bias of this kind could also be achieved by a ring spring which surrounds the diaphragm segments or, for example, by individual arcuate leaf springs which are arranged between the sides 68 of the diaphragm segments and the oppositely disposed wall regions of the mount 62 or 82 respectively.

The sidewalls of the mounts 62 and 82 form a type of compulsory guide or synchronization device which ensures that the diaphragm segments move synchronously, above all during the resetting movement but also during the hole formation.

The result of the above-described embodiment is to be seen in the fact that the diaphragm segments 60 lie in a first plane and in a second plane, in that the diaphragm segments 60 of the first plane (FIG. 2B) form a substantially polygonal hole 90, in that the diaphragm segments of the second plane (FIG. 2C) likewise form a substantially polygonal hole 80 and in that the polygonal hole 90 of the first plane is offset angularly by one half side length of the polygonal hole 90 relative to the polygonal hole 80 of the second plane.

Furthermore it is evident that each diaphragm segment 60, apart from rounded corner regions, has five straight sides, with three sides jointly forming two enclosed angles of 90° each and the two further sides forming a V-shape, likewise with an enclosed angle of 90°, with the two further enclosed angles of the diaphragm segments each being of 135°. Attention should also be paid to the fact that the diaphragm segments must have a certain lateral clearance between the sidewalls of the respective mounts 62 and 82, as is evident from FIGS. 2A and 2F in order to ensure the required mobility. The diaphragm segments 80 of the first plane slide on the diaphragm segments of the second plane and these in turn slide on the base surface of the mount 62.

Not shown in the Figures is a heater, whereby the component can be held at or can be heated to a matrix material dependent temperature, at least in the region of the piercing at which the matrix material of the composite material is not melted, but rather softens or becomes pasty, for example, heated to a temperature of 260° C. when the material is PA6. This heater can hold the tip 24 and the support 20 at the required operating temperature.

The tip 24 can be a tip which is specially used for the piercing process and which is repeatedly useable. It can, however, also be formed by a tip which is part of a bolt element and which can, for example, be present at the free end of the shaft part of the bolt element, as is described in the simultaneously filed German patent application of the present applicants with the attorney's file reference P10445PDE, the content of which is hereby made part of the content of the present application. Since each bolt element has its own tip it is not reused for a piercing process because the bolt element is subsequently connected in a form-fitted manner to the component and is in principle not separable from it. Furthermore, the tip can be formed by an auxiliary tip which is used with a hollow element such as a nut element as in the simultaneously filed German patent applications of the present applicant with the attorney's file reference P10443PDE and P10446PDE, the contents of which are hereby made part of the content of the present application. An auxiliary tip of this kind can also be used, for example, when it is a type of preceding hole punch or is only loosely inserted into the central passage of the hollow element. Alternatively, it can be a disposable auxiliary tip which is disposed of after the piercing process. Such disposable auxiliary tips can eventually be collected and sent back to the factory for the hollow elements where the tips can be reused, whereby unnecessary waste is avoided.

A particularly favorable embodiment of the invention will now be described with reference to FIGS. 3A to 3C and 4A to 4C. In these Figures the same reference numerals are used for parts or directions as used before in connection with the FIGS. 1A to 1C and 2A to 2F and it will be understood that the previous explanation of these parts and directions also applies for the embodiments of FIGS. 3A to 3C and 4A to 4C, unless something is stated to the contrary. This convention also applies for the entire description.

Figure 3A:
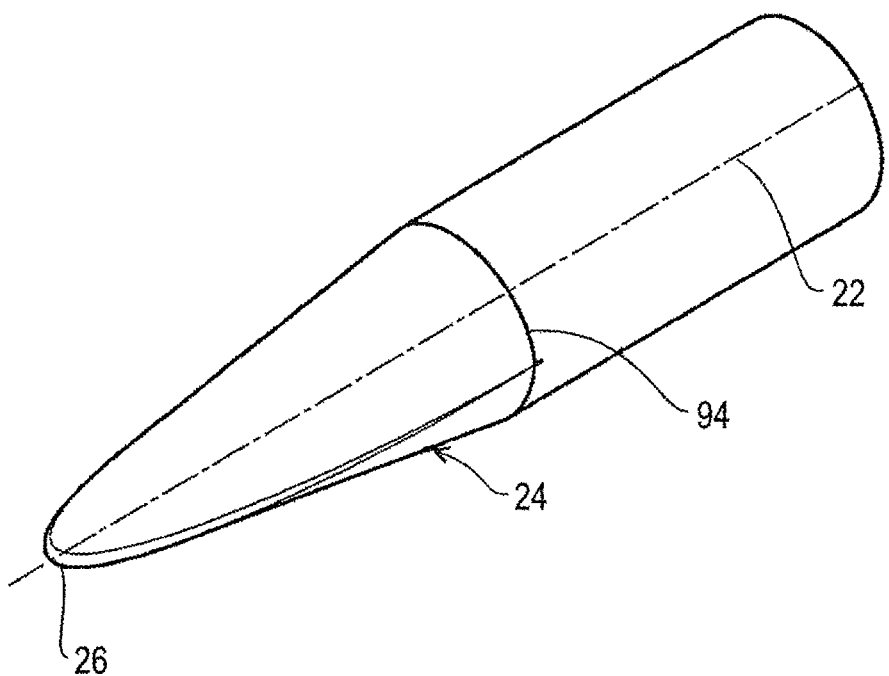
Figures 3B, 3C:
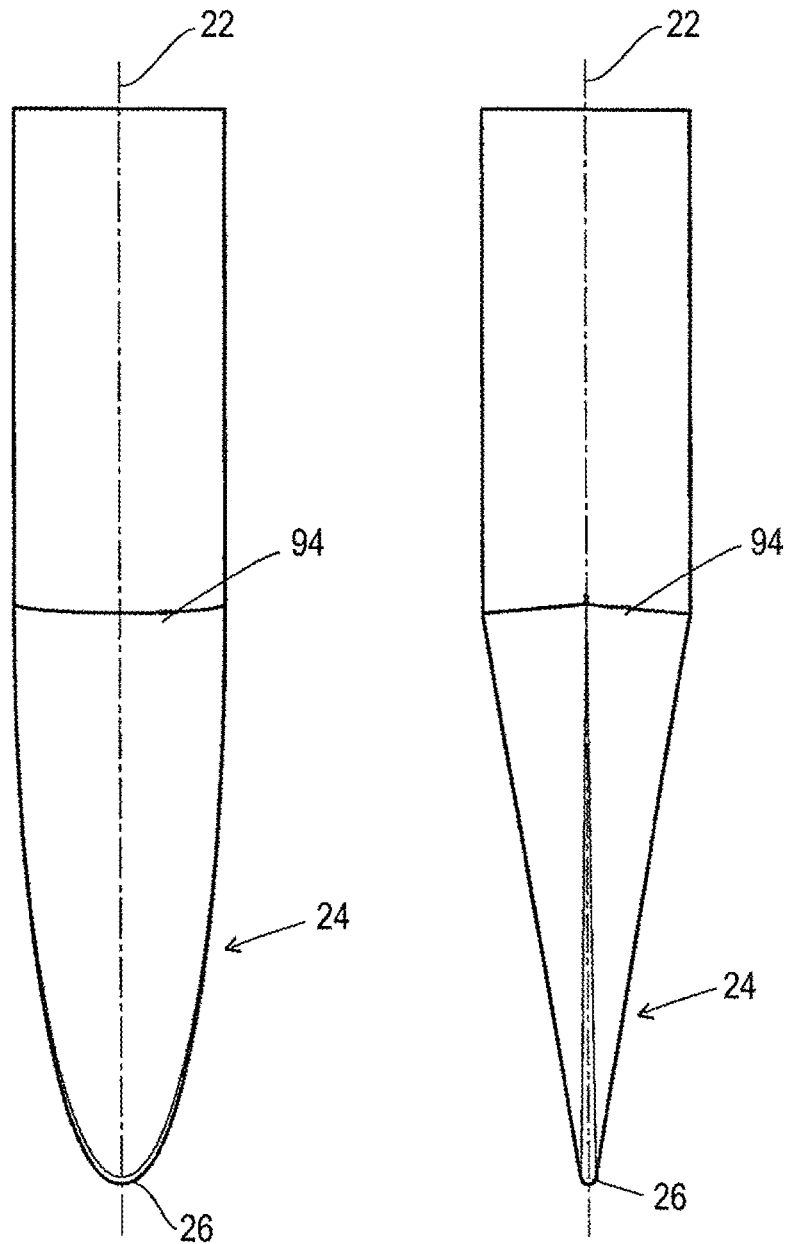
Figure 4A:
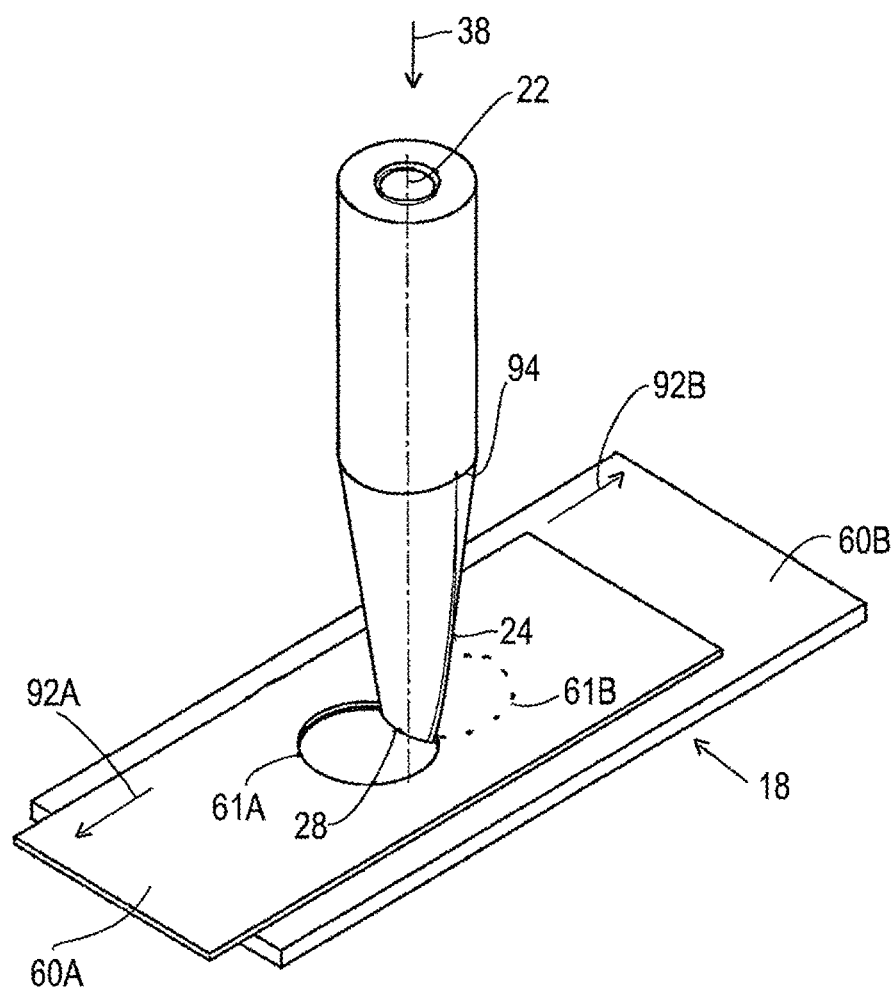
Figure 4B:
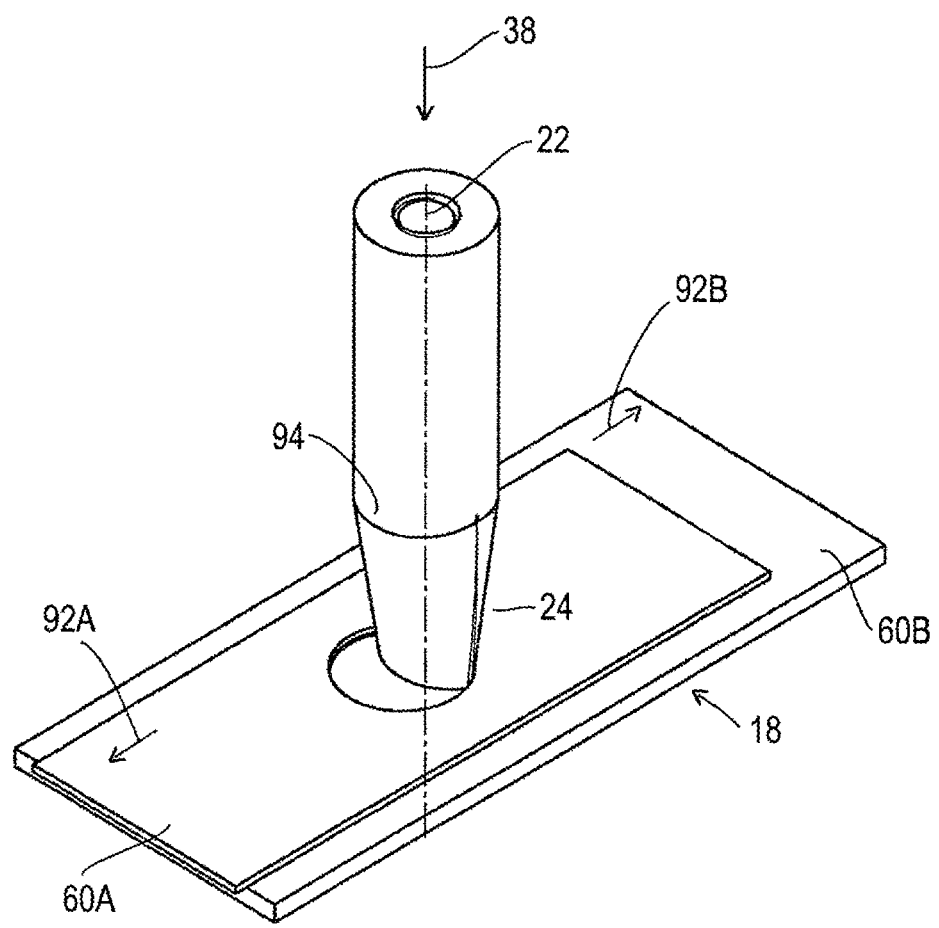
Figure 4C:
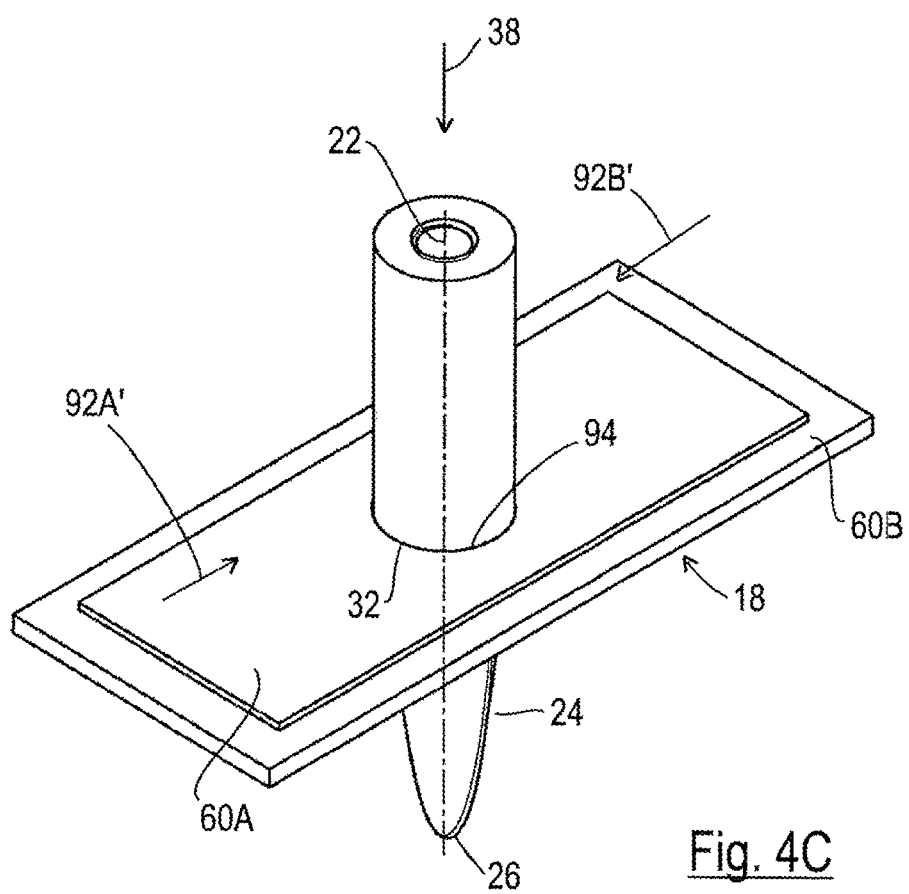

The piercing aid is used, as is shown in FIGS. 4A to 4C, in the form of the die button with iris diaphragm 18 in combination with a tip 24 which is either formed by the free end of the shaft part of the bolt (not shown) or as an auxiliary tip 24 as is shown in FIGS. 3A to 3C. As can be seen from the FIGS. 4A to 4C the cross-sectional shape or the cross-sectional size of the tip of the auxiliary tip 24 in the longitudinal direction of the tip or the auxiliary tip is always matched to the respective cross-sectional shape and cross-sectional size of the widening opening 28, 32 of the iris diaphragm. The auxiliary tip is shown per se in FIGS. 3A to 3C while the combination of the iris diaphragm 18 as such is shown in three different phases of the piercing process—however, without the composite material—in FIGS. 4A to 4C. In the embodiment of FIGS. 3A to 3C the tip or the auxiliary tip 24 has approximately the shape of a duck bill. Each cross-section perpendicular to the longitudinal direction 22 of the auxiliary tip 24 is formed by two overlapping circular arcs with the degree of the overlapping in the longitudinal direction 22 of the auxiliary tip progressively increasing starting from the smallest end in accordance with the degree of overlap of the two circular holes 61A and 61B of the plates 60A and 60B. At the position 94 of the full overlap of the auxiliary tip 24 then has a circular cross-section with a diameter equal to or slightly smaller than the diameter of the circular holes 61A and 61B of the two plates 60A and 60B respectively.

As can be seen from FIGS. 4A to 4C the matching of the cross-sectional shape and the cross-sectional size of the tip 24 to the cross-sectional shape and the cross-sectional size of the opening 28, 32 of the iris diaphragm 18 takes place in such a way that independently of the degree of penetration of the iris diaphragm 18 by the tip or the auxiliary tip the cross-sectional shape and cross-sectional size of the tip of the auxiliary tip 24 the area of the opening 28, 32 of the iris diaphragm 18 always corresponds to the cross-sectional shape and cross-sectional size of the respective opening 28, 32.

In the specific embodiment of FIGS. 4A to 4C the iris diaphragm 18 is equipped with two diaphragm segments 60A and 60B which are each formed by a plate having a circular hole 61A and 61B respectively, with the one plate 60A being capable of sliding on the lower plate 60B.

In the state shown in FIG. 4A the free end 26 of the auxiliary tip lies in the smallest opening 28 of the iris diaphragm which is formed by the overlap of the circular hole 61A of the upper plate 60A and of the circular hole 61B of the lower plate 60B. One notes that there are no free ends or other free regions through which the material of the composite material can escape.

The composite material is not shown here, however lies in accordance with FIG. 1B on the upper side of the iris diaphragm. The two plates are movable away from one another with increasing penetration of the tip in the arrow direction 92A and 92B starting from the starting position of FIG. 4A, for example, via the middle position in accordance with FIG. 4B into the end position in accordance with FIG. 4C. One sees that in the position of FIG. 4B there are likewise no free corners or other regions between the opening formed by the enlarged overlap of the plates of the iris diaphragm 18 and the respective cross-section of the auxiliary tip 24 in the region of the opening. This also applies to the end position in accordance with FIG. 4C in which the circular region of the auxiliary tip fully fills the circular opening in the two plates which are now fully aligned with one another and also for all intermediate positions between the position of FIG. 4A and FIG. 4C. The plates 60A and 60B can be reset from the position of maximum overlapping in accordance with FIG. 4C in the opposite arrow directions 92A' and 92B'.

As the relative movement of the two plates merely takes place in accordance with the arrows 92A, 92B, 92A' and 92B', only in one direction and in the opposite direction, the guidance of the two plates can be brought about very simply. For example, the thicker lower plate 60B can be guided in a flat longitudinal groove (not shown) in the free end face of a die button body (likewise not shown but similar to the die button body 64) and the upper thinner plate 60A can be guided in a corresponding flat groove in lower side of a cover disk (also not shown, but similar to the cover disk 84 of FIG. 2A) which is secured to the die button body 64, for example, by means of screws as are indicated at 88 in FIG. 2A.

The resetting of the two plates is also particularly simple to realize since the resetting device or the spring only has to act in one direction. It would also be conceivable to use two strips or recirculating belts instead of two plates which are provided with a plurality of circular holes such as 61A and 61B and which after each stroke of a possibly used press are transported further by one hole pitch in order to cooperate with an auxiliary tip. For each stroke of the press, a new component will be pierced when a hole forming the same component which is displaced between the strokes.

Finally it should be pointed out that the concept of using a tip or an auxiliary tip 64 of which the cross-sectional shape or cross-sectional size is matched to a shape and size of the opening of the iris diaphragm 18 is in no way restricted to the iris diaphragm 18 with only two diaphragm segments, but rather can in principle be used with all possible designs of an iris diaphragm with three, four or more diaphragm segments.

REFERENCE NUMERAL LIST 10 hole
12 component
14, 16 sides
18 iris diaphragm, piercing aid
20 support, die button
22 axial direction, longitudinal direction
24 tip, auxiliary tip
26 free end of the tip or of the auxiliary tip 24
28 smaller opening, starting opening
30 narrow region
32 larger opening
34 end face
36 diaphragm segments
38 arrow direction
40 tool
42 local upper side
44 hold-down member
46 lower end face
48 cylindrical region
52 thickened portion
60 diaphragm segments
60A plate, diaphragm segments
60B plate, diaphragm segments
61A circular opening of the plate 60A
61B circular opening of the plate 60B
62 square mount, opening
64 die button body
66 bore
68, 70 sides
72, 74, 76, 78 side surfaces
80 square opening
82 mount
84 disk
86 shoulder
88 positions
90 polygonal hole
92A direction of movement of the upper plate 60A
92B direction of movement of the lower plate 60B
92A' opposite direction of movement of the upper plate 60A
92B' opposite direction of movement of the lower plate 60B
94 position of the auxiliary tip 24 with maximum overlap of two circles

The invention claimed is:

1. A piercing aid in combination with a tip for a hole formation in a component (12), wherein the piercing aid is an iris diaphragm (18) having a smaller initial opening (28) which can be pressed open to a larger opening (32) during hole formation in the component, wherein the iris diaphragm has movably arranged diaphragm segments (36; 60) which are arranged in a mount or in a plurality of mounts of a die button body (64) wherein the diaphragm segments lie in a first plane and in a second plane, wherein the diaphragm segments of the first plane form an at least substantially polygonal hole, wherein the diaphragm segment of the second plane form an at least substantially polygonal hole, and wherein the polygonal hole of the first plane is offset angularly by one half side length of the polygonal hole of the first hole to the polygonal hole of the second plane.

2. The piercing aid in accordance with claim 1, wherein the component (12) consists of composite material.

3. The piercing aid in accordance with claim 1, wherein the composite material is selected as one of a fiber reinforced plastic part and a fabric reinforced plastic part.

4. The piercing aid in accordance with claim 1, wherein the iris diaphragm (18) has at least two to twelve movably arranged diaphragm segments (36; 60) which lie in one plane or in a plurality of planes.

5. The piercing aid in accordance with claim 1, wherein the movably arranged diaphragm segments (36; 60) are guidedly arranged.

6. The piercing aid in accordance with claim 1, wherein the one mount is formed in an end face of a die button body (64) confronting the component (12) and wherein a second mount is formed in a disk which is to be arranged on the end face of the die button body (64) or is arranged on the end face of the die button body (64) and can be secured to the latter by means of screws.

7. The piercing aid in accordance with claim 6, wherein the diaphragm segments (36; 60) of the iris diaphragm (18) which are arranged in the disk having a mount have a shoulder at the outer side which lies beneath the disk, whereby the diaphragm segments (36; 60) are guided in a manner secure against loss but displaceably within the mount.

8. The piercing aid in accordance with claim 1, wherein diaphragm segments (36; 60) of the iris diaphragm (18) are each or can each be biased into a position in which they form a smaller starting opening (28).

9. The piercing aid in accordance with claim 1, wherein a synchronization device is provided which synchronizes the movement of diaphragm segments (60).

10. The piercing aid in accordance with claim 9, wherein the synchronization device is formed at least partly by a tip which diverges in the axial direction.

11. The piercing aid in accordance with claim 9, wherein the synchronization device is formed by the peripheral shape of one mount or a plurality of mounts which receive the diaphragm segments.

12. The piercing aid in accordance with claim 9, wherein the synchronization device includes a compulsory guide which is movable synchronously with the formation of the hole.

13. The piercing aid in accordance with claim 1, wherein there are four diaphragm segments in each plane, wherein the diaphragm segments of each plane are arranged in a substantially square mount and wherein each diaphragm segment, apart from rounded corner regions, has five straight sides, with three sides forming with one another two enclosed angles of 90° each and the two further sides forming a V-shape and likewise with an included angle of 90°, with the two further included angles each amounting to 135°.

14. The piercing aid in accordance with claim 1, wherein the piercing aid has a heater whereby the component can be kept or heated in the area of the piercing to a matrix material dependent temperature at which the matrix material of the composite material does not melt but softens or is pasty.

15. The piercing aid in accordance with claim 14, wherein the component is heated to a temperature of 260° C. when the material is PA6.

16. The piercing aid in accordance with claim 1 in combination with a tip, which is formed by a free end face of a shaft part of a bolt or is formed as an auxiliary tip.

17. The piercing aid in accordance with claim 16, wherein the matching of the cross-sectional shape and size of the tip to the cross-sectional shape and size of the opening of the iris diaphragm takes place in such a way that, independent of the degree of penetration of the iris diaphragm by the tip or the auxiliary tip, the cross-sectional shape and cross-sectional size of the tip or of the auxiliary tip in the region of the opening of the iris diaphragm always corresponds to the cross-sectional shape and the cross-sectional size of the respective opening.

18. The piercing aid in accordance with claim 16, wherein the iris diaphragm is equipped with two diaphragm segments and wherein the tip or the auxiliary tip is of duck-beak shape.

19. The piercing aid in accordance with claim 18, wherein the diaphragm segments are each formed by a plate having a circular hole, with the one plate being slidable on the other plate.

20. A piercing aid in combination with a tip for a hole formation in a component (12), wherein the piercing aid is an iris diaphragm (18) having a smaller initial opening (28) which can be pressed open to a larger opening (32) during hole formation in the component, wherein the iris diaphragm has movable arranged diaphragm segments (36; 60) which are arranged in a mount or in a plurality of mounts of a die button body (64) wherein a synchronization device synchronizes the movement of the diaphragm segments such that the respective opening or size of the opening of the iris diaphragm is matched to the respective cross-sectional shape and cross-sectional size of the tip during the hole formation.

21. The piercing aid in accordance with claim 20, wherein the component (12) consists of composite material.

22. The piercing aid in accordance with claim 20, wherein the composite material is selected as one of a fiber reinforced plastic part and a fabric reinforced plastic part.

23. The piercing aid in accordance with claim 20, wherein the iris diaphragm (18) has at least two to twelve movably arranged diaphragm segments (36; 60) which lie in one plane or in a plurality of planes.

24. The piercing aid in accordance with claim 20, wherein the movably arranged diaphragm segments (36; 60) are guidedly arranged.

25. The piercing aid in accordance with claim 20, wherein the one mount is formed in an end face of a die button body (64) confronting the component (12) and wherein a second mount is formed in a disk which is to be arranged on the end face of the die button body (64) or is arranged on the end face of the die button body (64) and can be secured to the latter by means of screws.

26. The piercing aid in accordance with claim 25, wherein the diaphragm segments (36; 60) of the iris diaphragm (18) which are arranged in the disk having a mount have a shoulder at the outer side which lies beneath the disk, whereby the diaphragm segments (36; 60) are guided in a manner secure against loss but displaceably within the mount.

27. The piercing aid in accordance with claim 20, wherein the diaphragm segments (36; 60) of the iris diaphragm (18) are each or can each be biased into a position in which they form a smaller starting opening (28).

28. The piercing aid in accordance with claim 20, wherein the synchronization device is formed at least partly by a tip which diverges in the axial direction.

29. The piercing aid in accordance with claim 28, wherein the synchronization device is formed by the peripheral shape of one mount or a plurality of mounts which receive the diaphragm segments.

30. The piercing aid in accordance with claim 28, wherein the synchronization device includes a compulsory guide which is movable synchronously with the formation of the hole.

31. The piercing aid in accordance with claim 20, wherein diaphragm segments lie in a first plane and in a second plane; wherein the diaphragm segments of the first plane form an at least substantially polygonal hole, wherein the diaphragm segments of the second plane form an at least substantially polygonal hole and wherein the polygonal hole of the first plane is offset angularly by one half side length of the polygonal hole of the first hole to the polygonal hole of the second plane.

32. The piercing aid in accordance with claim 31, wherein there are four diaphragm segments in each plane, wherein the diaphragm segments of each plane are arranged in a substantially square mount and wherein each diaphragm segment, apart from rounded corner regions, has five straight sides, with three sides forming with one another two enclosed angles of 90° each and the two further sides forming a V-shape and likewise with an included angle of 90°, with the two further included angles each amounting to 135°.

33. The piercing aid in accordance with claim 20, wherein the piercing aid has a heater whereby the component can be kept or heated in the area of the piercing to a matrix material dependent temperature at which the matrix material of the composite material does not melt but softens or is pasty.

34. The piercing aid in accordance with claim 33, wherein the component is heated to a temperature of 260° C. when the material is PA6.

35. The piercing aid in accordance with claim 20 in combination with a tip, which is formed by a free end face of a shaft part of a bolt or is formed as an auxiliary tip.

36. The piercing aid in accordance with claim 35, wherein the matching of the cross-sectional shape and size of the tip to the cross-sectional shape and size of the opening of the iris diaphragm takes place in such a way that, independent of the degree of penetration of the iris diaphragm by the tip or the auxiliary tip, the cross-sectional shape and cross-sectional size of the tip or of the auxiliary tip in the region of the opening of the iris diaphragm always corresponds to the cross-sectional shape and the cross-sectional size of the respective opening.

37. The piercing aid in accordance with claim 36, wherein the iris diaphragm is equipped with two diaphragm segments and wherein the tip or the auxiliary tip is of duck-beak shape.

38. The piercing aid in accordance with claim 37, wherein the diaphragm segments are each formed by a plate having a circular hole, with the one plate being slidable on the other plate.

* * * * *